United States Patent
Jeyaram

(10) Patent No.: US 7,444,634 B2
(45) Date of Patent: Oct. 28, 2008

(54) METHOD AND APPARATUS FOR PROVIDING DYNAMIC LOCKS FOR GLOBAL RESOURCES

(75) Inventor: Prabahar Jeyaram, Bangalore (IN)

(73) Assignee: Sun Microsystems, Inc., Santa Clara, CA (US)

(*) Notice: Subject to any disclaimer, the term of this patent is extended or adjusted under 35 U.S.C. 154(b) by 939 days.

(21) Appl. No.: 10/285,177

(22) Filed: Oct. 31, 2002

(65) Prior Publication Data

US 2004/0088573 A1 May 6, 2004

(51) Int. Cl.
- G06F 9/46 (2006.01)
- G06F 7/00 (2006.01)
- G06F 12/00 (2006.01)
- G06F 13/00 (2006.01)
- G06F 13/28 (2006.01)

(52) U.S. Cl. .................... 718/104; 707/8; 707/205; 711/147; 711/168

(58) Field of Classification Search ......... 718/100–108, 718/1; 707/1–10, 100–104, 200–206; 709/226; 711/147, 168

See application file for complete search history.

(56) References Cited

U.S. PATENT DOCUMENTS

| | | | | |
|---|---|---|---|---|
| 5,285,528 A | * | 2/1994 | Hart | 710/200 |
| 5,301,337 A | * | 4/1994 | Wells et al. | 718/104 |
| 5,623,659 A | * | 4/1997 | Shi et al. | 707/8 |
| 5,692,178 A | * | 11/1997 | Shaughnessy | 707/8 |
| 5,734,909 A | * | 3/1998 | Bennett | 710/200 |
| 5,761,659 A | * | 6/1998 | Bertoni | 707/8 |
| 5,797,004 A | * | 8/1998 | Lindholm et al. | 718/104 |
| 5,835,906 A | * | 11/1998 | Hagersten et al. | 707/8 |
| 5,909,540 A | * | 6/1999 | Carter et al. | 714/4 |
| 5,983,225 A | * | 11/1999 | Anfindsen | 707/8 |
| 6,014,730 A | | 1/2000 | Ohtsu | 711/170 |
| 6,101,569 A | * | 8/2000 | Miyamoto et al. | 710/200 |
| 6,144,983 A | * | 11/2000 | Klots et al. | 718/104 |
| 6,247,099 B1 | * | 6/2001 | Skazinski et al. | 711/141 |
| 6,314,563 B1 | * | 11/2001 | Agesen et al. | 717/108 |
| 6,411,983 B1 | * | 6/2002 | Gallop | 718/104 |
| 6,430,638 B1 | * | 8/2002 | Kessler et al. | 710/200 |
| 6,836,887 B1 | * | 12/2004 | Such | 718/104 |
| 2004/0019639 A1 | * | 1/2004 | E et al. | 709/205 |
| 2004/0210902 A1 | * | 10/2004 | Such | 718/104 |
| 2006/0136926 A1 | * | 6/2006 | Goldick | 718/104 |

OTHER PUBLICATIONS

Agesen, Ole et al. "An Efficient Meta-lock for Implementing Ubiquitous Synchronization." ACM. 1999.*

Rajwar, Ravi et al. "Speculative Lock Elision: Enabling Highly Concurrent Multithreaded Execution." Dec. 5, 2001.*

* cited by examiner

*Primary Examiner*—Meng-Ai An
*Assistant Examiner*—Caroline Arcos
(74) *Attorney, Agent, or Firm*—Park, Vaughan & Fleming LLP

(57) ABSTRACT

One embodiment of the present invention provides a system that facilitates applying a dynamic lock to a range of a resource within a computer system. Upon receiving a request to lock to the range of the resource from a thread, the system examines an active lock pool to determine if the range of the resource is currently locked. If not, the system retrieves a dynamic lock from a free lock pool. Next, the system sets resource information in the dynamic lock so that the dynamic lock is associated with the resource. The system also sets owner information in the dynamic lock so that the dynamic lock is associated with the thread that is requesting the dynamic lock. Finally, the system adds the dynamic lock to the active lock pool.

17 Claims, 3 Drawing Sheets

METHOD AND APPARATUS FOR PROVIDING DYNAMIC LOCKS FOR GLOBAL RESOURCES

BACKGROUND

1. Field of the Invention

The present invention relates to techniques for ensuring exclusive access to global resources within a computer system. More specifically, the present invention relates to a method and an apparatus for providing dynamic locks for global resources in a multithreaded computing environment.

2. Related Art

Modern computer operating systems typically support concurrent execution of multiple threads. This enables a computer system to execute multiple applications simultaneously, which generally leads to better utilization of resources and higher system throughput. However, multi-threaded execution can cause data integrity problems if the multiple threads are allowed to concurrently access shared system resources, such as shared files or global data structures.

In order to alleviate this problem, operating systems typically make use of mutual exclusion locks (mutexes) to synchronize accesses shared resources. A thread wishing to access a shared resource must first acquire a mutex for the resource. Once the mutex has been acquired, the thread has exclusive access to the resource, and can make changes to the resource without interference by other threads. The other threads are only able to access the resource after the mutex has been released.

Mutexes are often incorporated into global data structures. For example, Table 1 illustrates code that defines an exemplary data structure including a mutex.

TABLE 1

```
typedef struct __resource {
    mutex *lock;
    <...>
    data structure members
    <...>
} Resource;
```

The first field within this data structure is a "lock field," which indicates whether or not the resource is currently "locked" by a thread.

Although this type of mutex can be used to control access to the resource, using this type of mutex has drawbacks. When the resource is locked, the entire resource is locked. This can create a contention problem if the current thread only accesses a small portion of the resource, and other threads are waiting to access other portions of the resource. Moreover, the mutex takes up space in the data structure, even if the mutex is not used.

Hence, what is needed is a method and an apparatus for locking shared resources within a computer system without the problems described above.

SUMMARY

One embodiment of the present invention provides a system that facilitates applying a dynamic lock to a range of a resource within a computer system. Upon receiving a request to lock the range of the resource from a thread, the system examines an active lock pool to determine if the range of the resource is currently locked. If not, the system retrieves a dynamic lock from a free lock pool. Next, the system sets resource information in the dynamic lock so that the dynamic lock is associated with the resource. The system also sets owner information in the dynamic lock so that the dynamic lock is associated with the thread that is requesting the dynamic lock. Finally, the system adds the dynamic lock to the active lock pool.

In a variation on this embodiment, the range of the resource includes at least one byte of the resource.

In a variation on this embodiment, examining the active lock pool involves performing a hash lookup into the active lock pool based on the range of the resource. If this hash lookup returns an active lock, the system determines whether the active lock is associated with the range of the resource by retrieving resource information from the active lock and then comparing the retrieved resource information with the range of the resource.

In a variation on this embodiment, if the range of the resource is currently locked, the system adds the thread that made the request to a list of waiters associated with the range of the resource.

In a variation on this embodiment, upon receiving a request to unlock the range of the resource, the system retrieves the dynamic lock from the active lock pool. The system then clears the resource information within the dynamic lock so that the dynamic lock is no longer associated with the resource. The system also clears owner information within the dynamic lock so that the dynamic lock is no longer associated with the thread. Next, the system notifies any waiters that may exist in a list of waiters that the range of the resource is available. Finally, the system returns the dynamic lock to the free lock pool.

In a variation on this embodiment the range of the resource can include, a portion of a process address space, a portion of a file, and a portion of a global data structure.

Table 1 presents computer code that defines a data structure including a mutex.

Table 2 presents computer code that defines a dynamic lock structure in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, semiconductor storage devices such as random access memory (RAM), magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
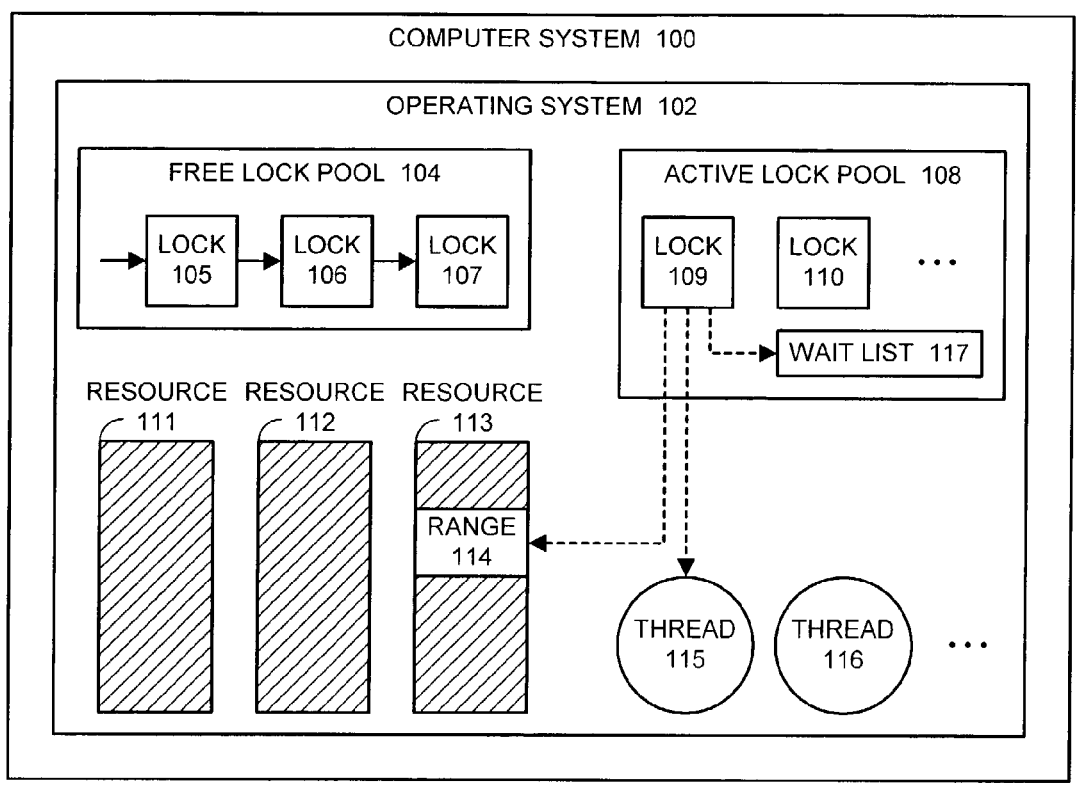
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

A multi-threaded operating system 102 runs within computer system 100 and facilitates execution of various applications on computer system 100. In particular, operating system 102 supports concurrent execution of a number of threads 115-116 (processes) on computer system 100.

Operating system 102 also facilitates sharing of a number of resources 111-113 between threads 115-116. These shared resources 111-113 can, for example, include process address spaces, files, or global data structures.

Operating system 102 also provides a number of locks that can be dynamically allocated to lock ranges (subsets) of resources 111-113. Note that a range of a resource can include as little as a single byte of the resource, or as much as the entire resource.

Table 2 illustrates a definition of a dynamic lock structure in accordance with an embodiment of the present invention.

TABLE 2

```
typedef union __dlock {
    struct __info
        void *resource;
        void *owner;
        void *waiter;
    } info;
    struct __opaque {
        void *data[3];
    } opaque;
} Dlock;
```

Note that the info structure defined in Table 2 includes a pointer to the resource, a pointer to the owner of the lock, as well as a pointer to the waiters list. The type definition in Table 2 also includes an opaque structure, which overlays the info structure to facilitate hiding details of the info structure.

When locks are available to be allocated, they reside in a free lock pool 104. For example, in FIG. 1 free lock pool 104 contains a linked list of locks 105-107 that are available to be allocated. On the other hand, if the locks are already allocated to resources, they reside in active lock pool 108. More specifically, in FIG. 1, active lock pool 108 includes locks 109-110.

As is illustrated in FIG. 1, a lock 109 within active lock pool 108 is associated with a resource range 114 within resource 113. Lock 109 is also associated with a thread 115, which owns of the lock. Lock 109 can additionally be associated with a wait list 117, which identifies threads that are waiting to access resource range 114 in situations where resource range 114 is locked.

Process of Unlocking a Range of a Resource

Figure 2:
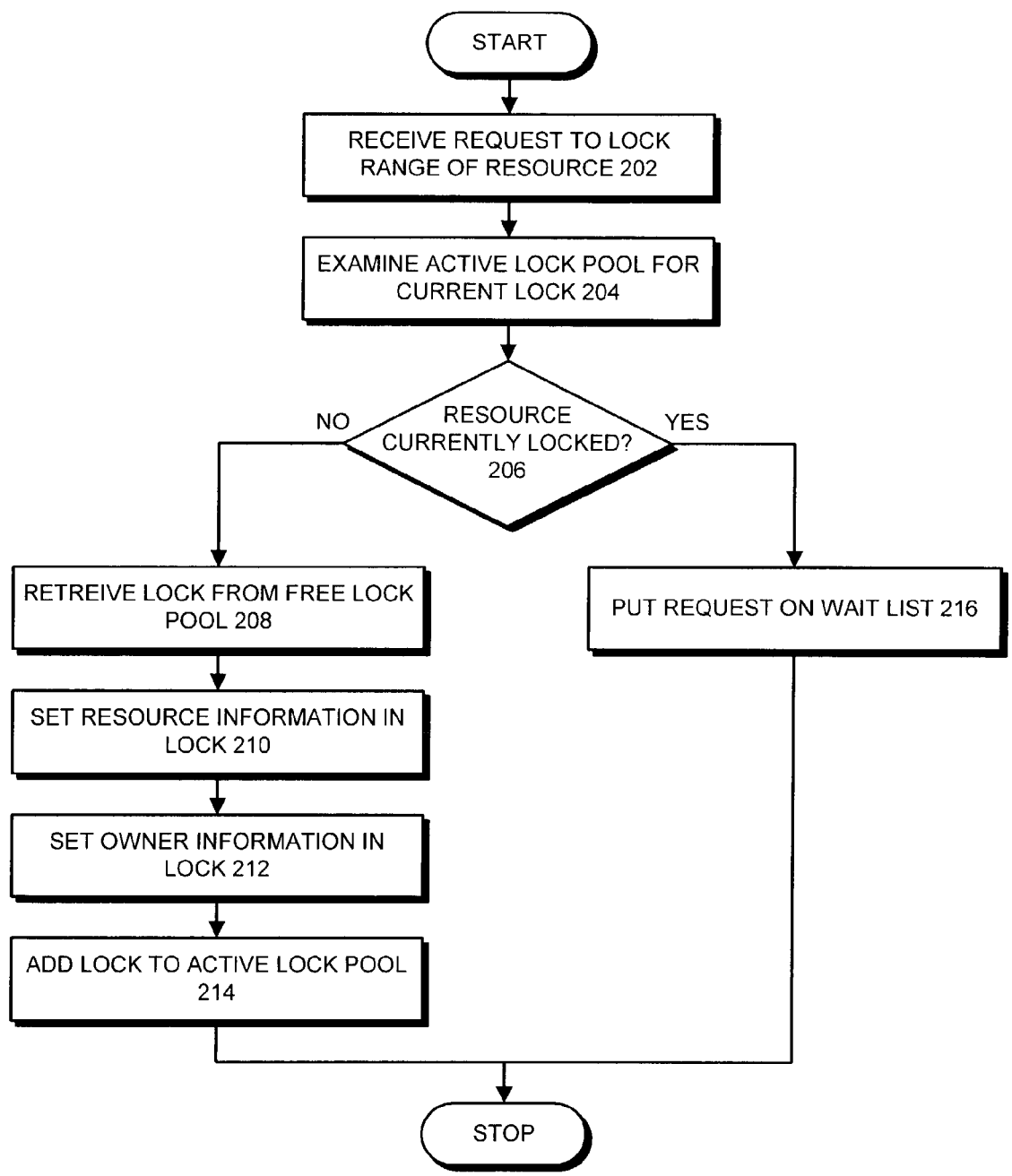
FIG. 2 presents a flowchart illustrating the process of locking a range of a resource in accordance with an embodiment of the present invention.

FIG. 2 presents a flowchart illustrating the process of locking a range of a resource in accordance with an embodiment of the present invention. The system starts by receiving a request to a lock a range of a resource (step 202). Upon receiving this request, the system examines active lock pool 108 (step 204). This allows the system to determine if the resource is currently locked (step 206).

In one embodiment of the present invention, active lock pool 108 is organized as a hash table. This allows a hash lookup to be performed on the range of the resource to determine if the range is locked.

If at step 206 the resource is currently locked, the system puts the thread that made the request onto a wait list associated with the lock (step 216). This allows the thread to be subsequently notified when the lock has been released.

Otherwise, if the resource is not locked at step 206, the system retrieves a lock from free lock pool 104 (step 208). The system then initializes the lock by setting resource information within the lock to identify the range of the resource (step 210). The system also sets owner information within the lock to indicate that the thread that made the request is the owner of the range (portion) of the resource (step 212). Finally, the system adds the lock to active lock pool 108 so that other threads will be able to determine that the resource is locked (step 214).

Process of Unlocking a Range of a Resource

Figure 3:
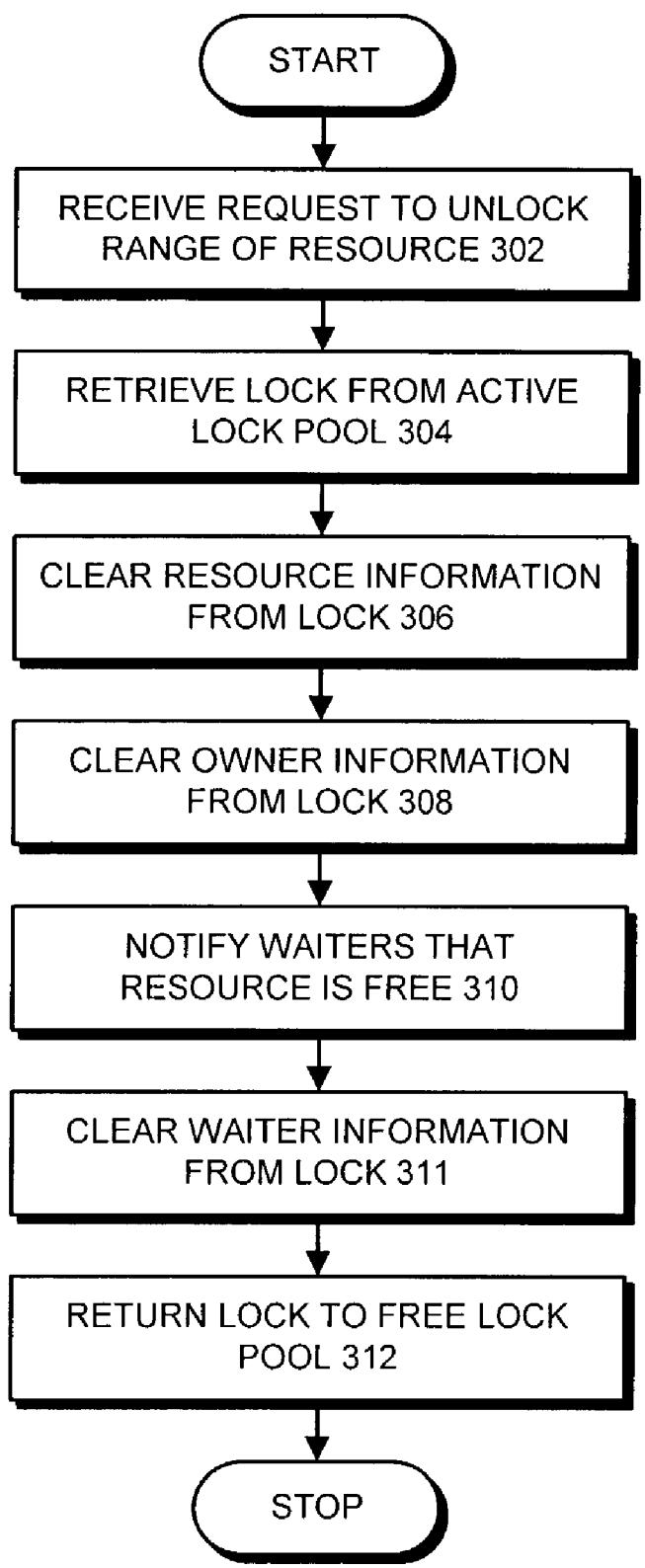
FIG. 3 presents a flowchart illustrating the process of unlocking a range of a resource in accordance with an embodiment of the present invention.

FIG. 3 presents a flowchart illustrating the process of unlocking a range of a resource in accordance with an embodiment of the present invention. Upon receiving a request to unlock a range of a resource (step 302), the system retrieves the lock for the resource from active lock pool 108 (step 304). Next, the system clears resource information from the lock (step 306). The system also clears the owner information from the lock (step 308).

Next, the system notifies any threads that may be waiting for the resource that the resource is now free (step 310). The system then clears waiter information from the lock (step 311). Finally, the system returns the lock to free lock pool 104 (step 312).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for applying a dynamic lock to a range of a resource within a computer system, comprising:

receiving a request to lock to the range of the resource from a thread in the computer system, wherein the range of the resource is a portion of the resource;

examining an active lock pool to determine if the range of the resource is currently locked, wherein the active lock pool is organized as a hash table and wherein examining the active lock pool involves performing a hash lookup into the active lock pool based on the range of the resource, if the hash lookup returns an active lock, determining whether the active lock is associated with the range of the resource by retrieving resource information from the active lock and comparing the resource information with the range of the resource; and if the range of the resource is not currently locked, retrieving the dynamic lock from a free lock pool, setting resource information in the dynamic lock so that the dynamic lock is associated with the range of the resource, setting owner information in the dynamic lock so that the dynamic lock is associated with the thread that is requesting the dynamic lock, and adding the dynamic lock to the active lock pool; whereby locking the range of the resource protects the locked portion of the resource without preventing other threads from locking and accessing other portions of the resource.

2. The method of claim 1, wherein the range of the resource includes at least one byte of the resource.

3. The method of claim 1, wherein if the range of the resource is currently locked, the method further comprises adding the thread that made the request to a list of waiters associated with the range of the resource.

4. The method of claim 1, further comprising:

receiving a request to unlock the range of the resource;

retrieving the dynamic lock from the active lock pool;

clearing the resource information within the dynamic lock so that the dynamic lock is no longer associated with the resource;

clearing the owner information within the dynamic lock so that the dynamic lock is no longer associated with the thread;

notifying any waiters that may exist in a list of waiters associated with the range of the resource that the range of the resource is available;

clearing waiter information within the dynamic lock so that the dynamic lock is no longer associated with any waiters on the list of waiters; and returning the dynamic lock to the free lock pool.

5. The method of claim 1, wherein the range of the resource can include:

a portion of a process address space;

a portion of a file; and a portion of a global data structure.

6. A computer-readable storage medium storing instructions that when executed by a computer cause the computer to perform a method for applying a dynamic lock to a range of a resource within a computer system, the method comprising:

receiving a request to lock to the range of the resource from a thread in the computer system, wherein the range of the resource is a portion of the resource;

examining an active lock pool to determine if the range of the resource is currently locked, wherein the active lock pool is organized as a hash table and wherein examining the active lock pool involves performing a hash lookup into the active lock pool based on the range of the resources and wherein the hash lookup returns and active lock, the method further comprises determining whether the active lock is associated with the range of the resource by retrieving resource information from the active lock and comparing the resource information with the range of the resource;

if the range of the resource is not currently locked, retrieving the dynamic lock from a free lock pool, setting resource information in the dynamic lock so that the dynamic lock is associated with the range of the resource, setting owner information in the dynamic lock so that the dynamic lock is associated with the thread that is requesting the dynamic lock, and adding the dynamic lock to the active lock pool;

whereby locking the range of the resource protects the locked portion of the resource without preventing other threads from locking and accessing other portions of the resource.

7. The computer-readable storage medium of claim 6, wherein the range of the resource includes at least one byte of the resource.

8. The computer-readable storage medium of claim 6, wherein if the range of the resource is currently locked, the method further comprises adding the thread that made the request to a list of waiters associated with the range of the resource.

9. The computer-readable storage medium of claim 6, wherein the method further comprises:

receiving a request to unlock the range of the resource;

retrieving the dynamic lock from the active lock pool;

clearing the resource information within the dynamic lock so that the dynamic lock is no longer associated with the resource;

clearing the owner information within the dynamic lock so that the dynamic lock is no longer associated with the thread;

notifying any waiters that may exist in a list of waiters associated with the range of the resource that the range of the resource is available;

clearing waiter information within the dynamic lock so that the dynamic lock is no longer associated with any waiters on the list of waiters; and returning the dynamic lock to the free lock pool.

10. The computer-readable storage medium of claim 6, wherein the range of the resource can include:

a portion of a process address space;

a portion of a file; and a portion of a global data structure.

11. A apparatus for applying a dynamic lock to a range of a resource within a computer system, comprising:

a processor;

a receiving mechanism configured to receive a request to lock to the range of the resource from a thread in the computer system, wherein the range of the resource is a portion of the resource;

an examining mechanism configured to examine an active lock pool to determine if the range of the resource is currently locked, wherein the active lock pool is organized as a hash table and wherein the examining mechanism is further configured to perform a hash lookup into the active lock pool based on the range of the resource; and wherein if the hash lookup returns an active lock, the examining mechanism is configured to retrieve resource information from the active lock and compare the resource information with the range of the resource to determine whether the active lock is associated with the range of the resource;

a locking mechanism, wherein if the range of the resource is not currently locked, the locking mechanism is configured to, retrieve the dynamic lock from a free lock pool, set resource information in the dynamic lock so that the dynamic lock is associated with the range of the resource, set owner information in the dynamic lock so that the dynamic lock is associated with the thread that is requesting the dynamic lock, and to add the dynamic lock to the active lock pool;

whereby locking the range of the resource protects the locked portion of the resource without preventing other threads from locking and accessing other portions of the resource.

12. The apparatus of claim 11, wherein the range of the resource includes at least one byte of the resource.

13. The apparatus of claim 11, wherein if the range of the resource is currently locked, the locking mechanism is configured to add the thread that made the request to a list of waiters associated with the range of the resource.

14. The apparatus of claim 11, further comprising an unlocking mechanism that is configured to:

receive a request to unlock the range of the resource;

retrieve the dynamic lock from the active lock pool;

clear the resource information within the dynamic lock so that the dynamic lock is no longer associated with the resource;

clear the owner information within the dynamic lock so that the dynamic lock is no longer associated with the thread;

notify any waiters that may exist in a list of waiters associated with the range of the resource that the range of the resource is available;

clear waiter information within the dynamic lock so that the dynamic lock is no longer associated with any waiters on the list of waiters; and to return the dynamic lock to the free lock pool.

15. The apparatus of claim 11, wherein the range of the resource can include:

a portion of a process address space;

a portion of a file; and a portion of a global data structure.

16. A computer system for applying a dynamic lock to a range of a resource, comprising:

a processor;

a memory;

an operating system that supports multiple threads;

an active lock pool within the operating system, wherein the active lock pool is organized as a hash table;

a free lock pool within the operating system;

a receiving mechanism within the operating system that is configured to receive a request to lock to the range of the resource from a thread, wherein the range of the resource is a portion of the resource;

an examining mechanism within the operating system configured to perform a hash lookup into the active lock pool based on the range of the resource to determine if the range of the resource is currently locked; and wherein if the hash lookup returns an active lock the examining mechanism is configured to retrieve resource information from the active lock and compare the resource information with the range of the resource to determine whether the active lock is associated with the range of the resource;

a locking mechanism within the operating system, wherein if the range of the resource is not currently locked the locking mechanism is configured to, retrieve the dynamic lock from the free lock pool, set resource information in the dynamic lock so that the dynamic lock is associated with the range of the resource, set owner information in the dynamic lock so that the dynamic lock is associated with the thread that is requesting the dynamic lock, and to add the dynamic lock to the active lock pool.

whereby locking the range of the resource protects the locked portion of the resource without preventing other threads from locking and accessing other portions of the resource.

17. The computer system of claim 16, further comprising an unlocking mechanism that is configured to:

receive a request to unlock the range of the resource;

retrieve the dynamic lock from the active lock pool;

clear the resource information within the dynamic lock so that the dynamic lock is no longer associated with the resource;

clear the owner information within the dynamic lock so that the dynamic lock is no longer associated with the thread;

notify any waiters that may exist in a list of waiters associated with the range of the resource that the range of the resource is available;

clear waiter information within the dynamic lock so that the dynamic lock is no longer associated with any waiters on the list of waiters; and to return the dynamic lock to the free lock pool.

* * * * *